US012739617B2

(12) United States Patent
Agrawal et al.

(10) Patent No.: US 12,739,617 B2
(45) Date of Patent: Sep. 15, 2026

(54) AUTOMATIC eSIM TRANSFER BETWEEN DEVICES

(71) Applicant: Motorola Mobility LLC, Chicago, IL (US)

(72) Inventors: Amit Kumar Agrawal, Bangalore (IN); Chase Weigt, Lake Zurich, IL (US); Mayank Rajesh Gupta, Naperville, IL (US)

(73) Assignee: Motorola Mobility LLC, Chicago, IL (US)

(*) Notice: Subject to any disclaimer, the term of this patent is extended or adjusted under 35 U.S.C. 154(b) by 277 days.

(21) Appl. No.: 18/613,416

(22) Filed: Mar. 22, 2024

(65) Prior Publication Data

US 2025/0301305 A1 Sep. 25, 2025

(51) Int. Cl.
*H04W 8/20* (2009.01)
*H04W 12/06* (2021.01)

(52) U.S. Cl.
CPC .......... *H04W 8/205* (2013.01); *H04W 12/06* (2013.01)

(58) Field of Classification Search
CPC ....... H04W 8/205; H04W 12/35; H04W 4/60; H04W 8/20; H04W 12/43; H04W 12/72; H04W 12/06
See application file for complete search history.

(56) References Cited

U.S. PATENT DOCUMENTS

| | | | | |
|---|---|---|---|---|
| 11,064,347 | B1 * | 7/2021 | Dreiling | H04W 12/043 |
| 11,146,948 | B1 * | 10/2021 | Uehling | H04W 12/30 |
| 11,272,336 | B2 * | 3/2022 | Hadadi | H04W 8/183 |
| 2020/0037153 | A1 * | 1/2020 | Anand | H04W 12/35 |
| 2021/0076204 | A1 * | 3/2021 | Goyal | H04L 67/306 |
| 2023/0079902 | A1 * | 3/2023 | Jin | H04W 12/35 455/558 |
| 2023/0081421 | A1 * | 3/2023 | Jin | H04W 8/205 455/418 |
| 2023/0083018 | A1 * | 3/2023 | Jin | H04W 8/205 455/418 |
| 2023/0403563 | A1 * | 12/2023 | Lee | H04W 12/04 |
| 2024/0147216 | A1 * | 5/2024 | Kim | H04W 8/183 |
| 2024/0187841 | A1 * | 6/2024 | Homorodi | H04W 8/205 |
| 2024/0349035 | A1 * | 10/2024 | Orcutt | H04W 64/003 |
| 2025/0016546 | A1 * | 1/2025 | Chittoor | H04W 8/205 |
| 2025/0097688 | A1 * | 3/2025 | Orcutt | H04W 8/183 |
| 2025/0119727 | A1 * | 4/2025 | Nimbavikar | H04W 4/24 |

FOREIGN PATENT DOCUMENTS

WO WO-2024097475 A1 * 5/2024 ............ H04W 48/18

OTHER PUBLICATIONS

Malhotra, Vanshika , "boAt Introduces New Smartwatch with Jio's eSIM Support", Beebom, Dec. 9, 2023, 10 pages.

* cited by examiner

*Primary Examiner* — Dung Hong
(74) *Attorney, Agent, or Firm* — FIG. 1 Patents

(57) ABSTRACT

In aspects of automatic eSIM transfer between devices, a first device having a first embedded subscriber identity module (eSIM) chip determines, while an eSIM profile associated with a user is activated on the first eSIM chip, that the user is transitioning from using the first device to using a second device. In response, the first device initiates a transfer of the eSIM profile from the first device to the second device. The transfer causes deactivation of the eSIM profile on the first eSIM chip and activation of the eSIM profile on a second eSIM chip of the second device.

20 Claims, 8 Drawing Sheets

Input Data 204

Authentication Data 212

Primary Device 102

Transfer Event Detection Module 138

Authentication Module 306

Transfer Event 202

Successful Authentication 214 eSIM Profile 132

Transfer Initiation Module 140

Activation Instruction 218 eSIM Profile 132

Transfer Notification 302 eSIM Chip 128

Deactivation Notification 304

Secondary Device 104

Activation/Deactivation Module 216

Deactivation Instruction 206 eSIM Profile 132 eSIM Chip 130

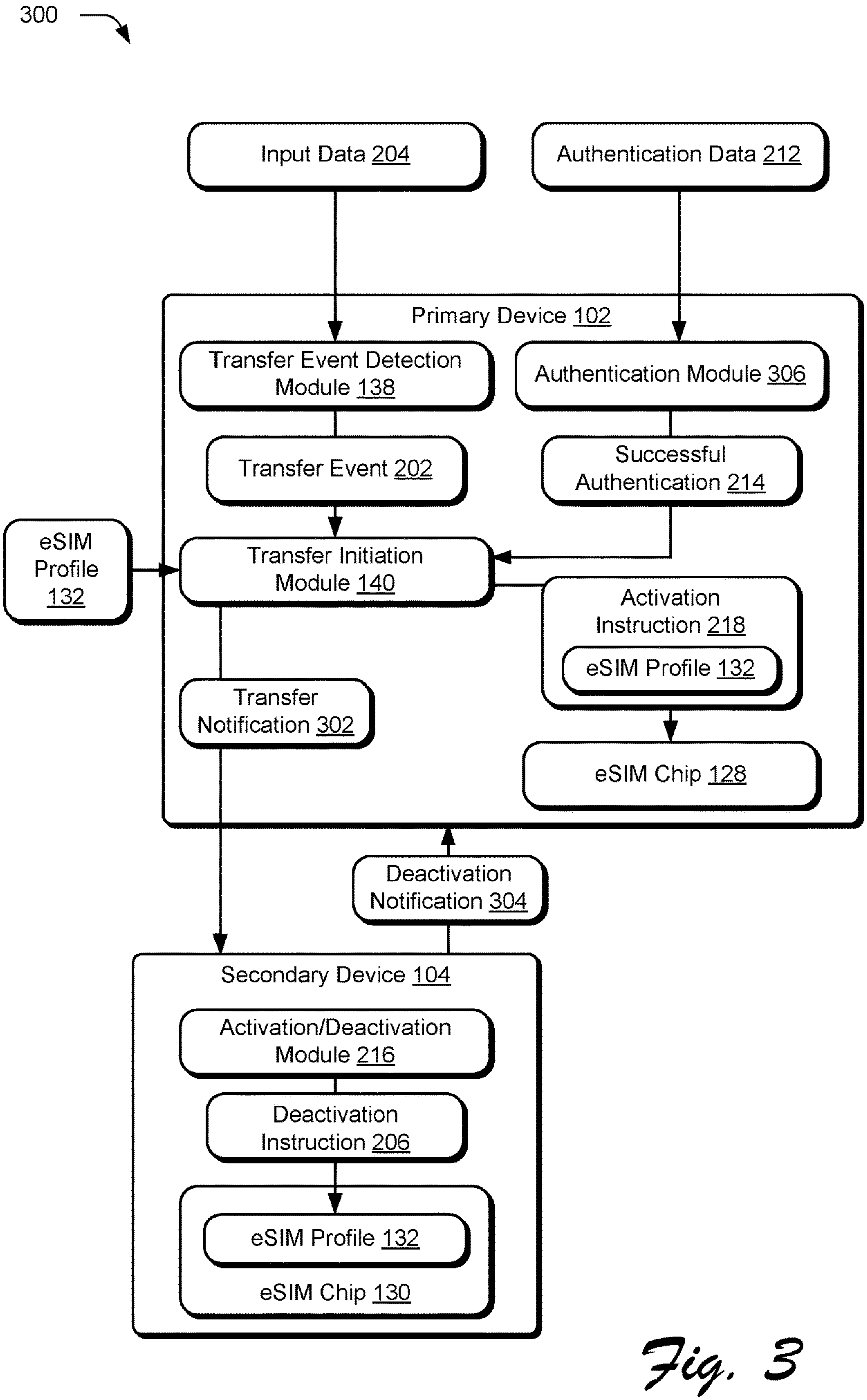

502
Determine, while an eSIM profile associated with a user is activated on a first eSIM chip of a primary device, that the user is transitioning from using the primary device to using a secondary device 504
Initiate a transfer of the eSIM profile from the primary device to the secondary device, the transfer causing deactivation of the eSIM profile on the first eSIM chip and activation of the eSIM profile on a second eSIM chip of the secondary device 506
Determine, while the eSIM profile is activated on the second eSIM chip, that the user is transitioning from using the secondary device to using the primary device.

508
Initiate an additional transfer of the eSIM profile from the secondary device to the primary device, the additional transfer causing deactivation of the eSIM profile on the second eSIM chip and activation of the eSIM profile on the first eSIM chip

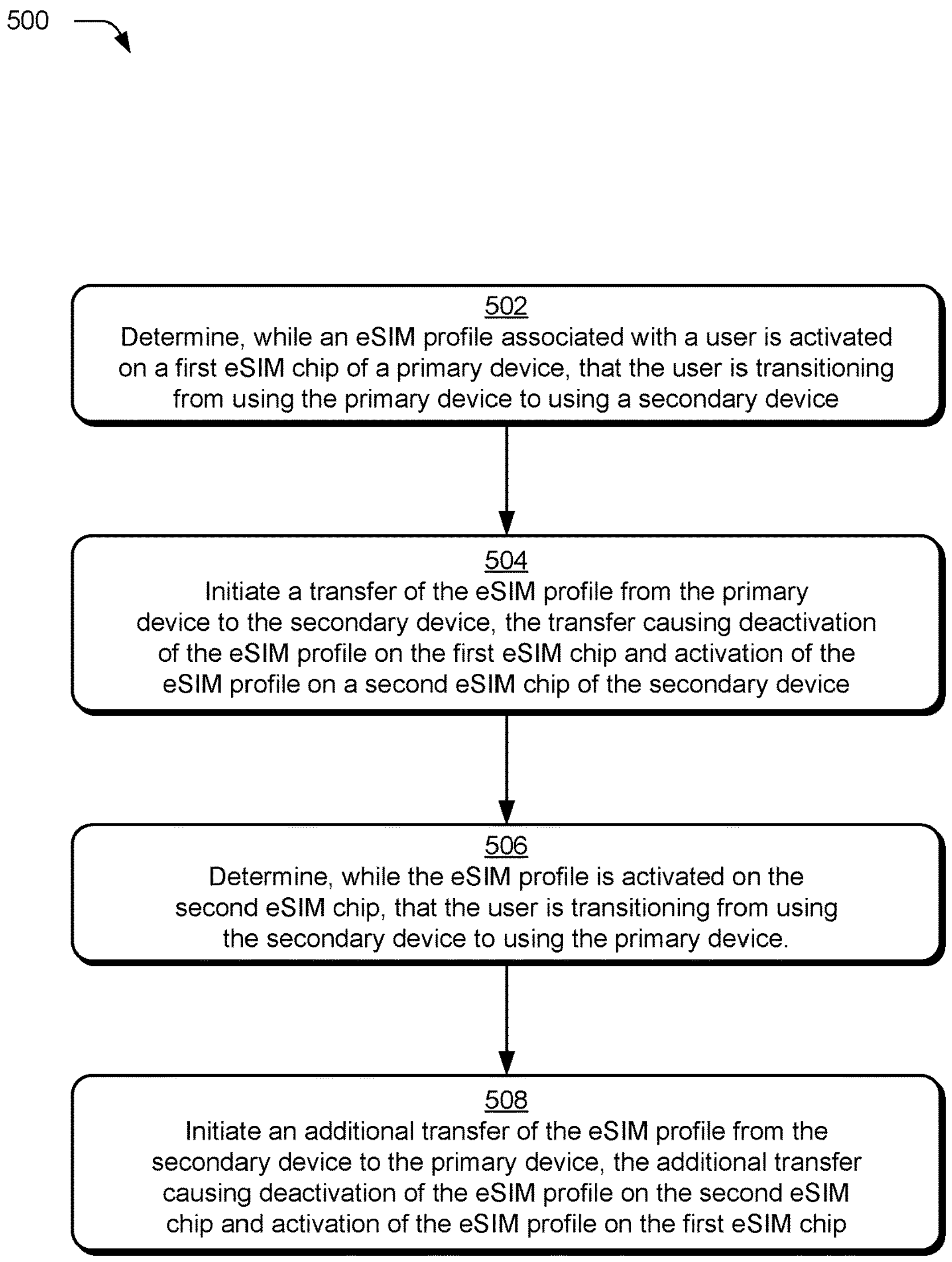

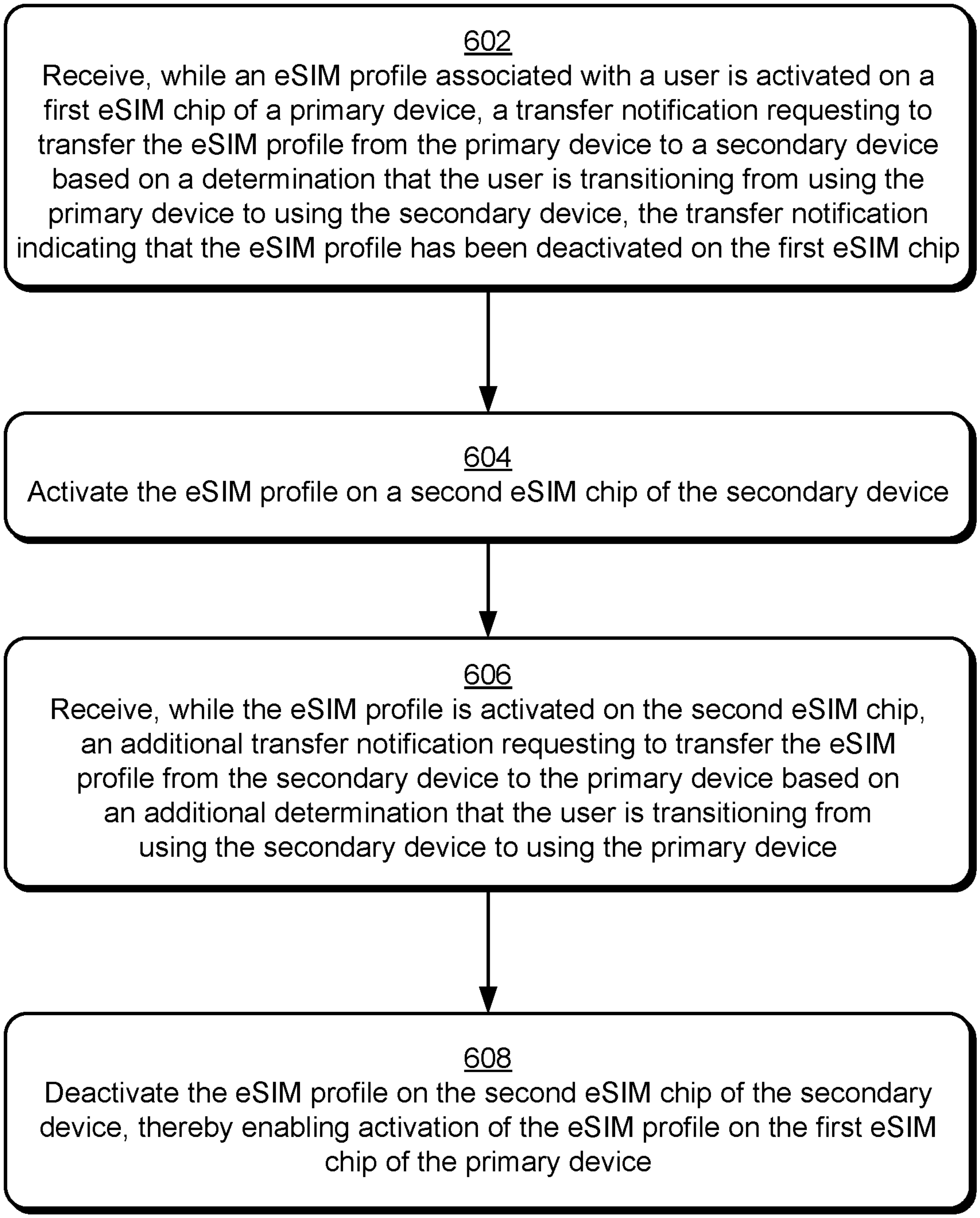

602
Receive, while an eSIM profile associated with a user is activated on a first eSIM chip of a primary device, a transfer notification requesting to transfer the eSIM profile from the primary device to a secondary device based on a determination that the user is transitioning from using the primary device to using the secondary device, the transfer notification indicating that the eSIM profile has been deactivated on the first eSIM chip 604
Activate the eSIM profile on a second eSIM chip of the secondary device 606
Receive, while the eSIM profile is activated on the second eSIM chip, an additional transfer notification requesting to transfer the eSIM profile from the secondary device to the primary device based on an additional determination that the user is transitioning from using the secondary device to using the primary device 608
Deactivate the eSIM profile on the second eSIM chip of the secondary device, thereby enabling activation of the eSIM profile on the first eSIM chip of the primary device

AUTOMATIC eSIM TRANSFER BETWEEN DEVICES

BACKGROUND

A subscriber identity module (SIM) chip stores an international mobile subscriber identity (IMSI) number and a security key, which are used to authenticate and identify a device as a subscriber to a mobile network operator. In other words, the SIM chip enables a device to access services (e.g., cellular network access, making calls, sending and receiving short message service (SMS) text messages, etc.) that are provided by the mobile network operator. In order to access the services provided by the mobile network operator on different devices, removable SIM chip technology relies on physical removal of a SIM chip from a device and physical placement of the SIM chip in a different device. This is a time consuming and complex process. In contrast, embedded SIM (eSIM) chips are integrated circuits that are embedded directly within the hardware of a device. Given this, eSIM profiles (e.g., including a unique IMSI number and associated security key) are transferrable between devices without physically removing hardware components between the devices.

BRIEF DESCRIPTION OF THE DRAWINGS

Aspects of automatic eSIM transfer between devices are described with reference to the following Figures. The same numbers may be used throughout to reference similar features and components that are shown in the Figures.

FIG. 3 depicts an example system in which aspects of automatic eSIM transfer between devices can be implemented to transfer an eSIM profile to a primary device.

FIG. 5 is an example method for automatic eSIM transfer between devices, as implemented by a primary device.

FIG. 6 is an example method for automatic eSIM transfer between devices, as implemented by a secondary device.

DETAILED DESCRIPTION

Figure 1:
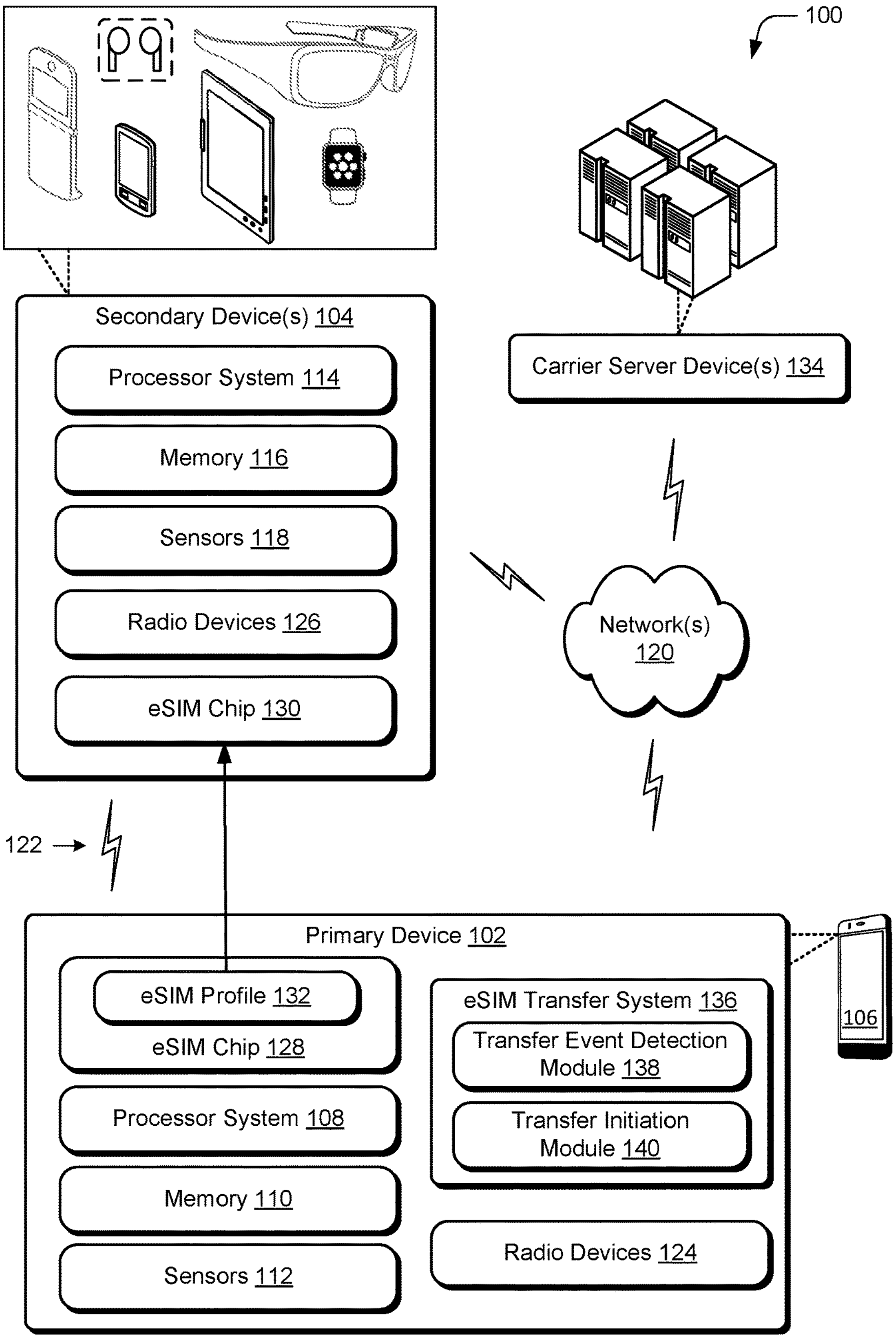
FIG. 1 illustrates an example environment in which aspects of automatic eSIM transfer between devices can be implemented.

Techniques for automatic eSIM transfer between devices are described herein as implemented by a primary device, which is communicatively coupled with a secondary device. The primary device includes a first embedded subscriber identity module (eSIM) chip, and the secondary device includes a second eSIM chip. The eSIM chips are configured to store one or more eSIM profiles, which enable provision of services from a mobile network operator (e.g., a carrier) to the primary device and the secondary device. By way of example, when an eSIM profile is activated on an eSIM chip of a device, the device is able to access the cellular network operated by the carrier, as well as make calls and send/receive text messages using a phone number associated with the eSIM profile.

The eSIM chips are integrated circuits embedded directly into the hardware of the primary and secondary devices, and are not physically transferrable between devices. Thus, unlike removable SIM chips, eSIM chips enable transfer of an eSIM profile (e.g., and transfer of access to corresponding carrier services) between devices without physically removing hardware components from the devices. However, conventional eSIM technology relies on user input to initiate a transfer of an eSIM profile between devices. Consider an example in which the user wishes to take the secondary device (e.g., a smartwatch) and not the primary device (e.g., a smartphone) with the user for an outdoor workout, but the user still wishes to receive electronic communications (e.g., emails, text messages, emails, etc.) during the outdoor workout. In this example, conventionally-configured eSIM technology relies on user input to manually deactivate the eSIM profile on the primary device, and manually activate the eSIM profile on the secondary device. In certain scenarios, the user may forget to transfer the eSIM profile to the secondary device prior to the outdoor workout, and as such, the user may fail to receive time-sensitive or otherwise important electronic communications.

Accordingly, techniques are described for automatic eSIM transfer between devices which overcome the drawbacks of conventional eSIM transfer techniques. The described techniques are implemented by an eSIM transfer system of the primary device. While an eSIM profile associated with a user is activated on the first eSIM chip of the primary device, the eSIM transfer system detects a transfer event. Here, the transfer event indicates that the user is transitioning from using the primary device to using the secondary device. Generally, the primary device and the secondary device are used in different contexts, and the transfer event is based on a determination that a current context of the primary device and the secondary device matches a context in which the primary device is typically used. As an illustrative and non-limiting example, the transfer event corresponds to the user being detected as proximate to the secondary device, while the primary device is at least a threshold distance away from the secondary device.

In response to the transfer event being detected, the eSIM transfer system initiates a transfer of the eSIM profile from the primary device to the secondary device. As part of this, the eSIM transfer system deactivates the eSIM profile on the first eSIM chip of the primary device. In response, the eSIM transfer system communicates a transfer notification to the secondary device, which prompts the secondary device to authenticate the user on the secondary device as a registered user of the eSIM profile, e.g., using a PIN, password, biometric authentication, etc. Upon a successful authentication of the user on the secondary device, the eSIM profile is activated on the secondary device. Thereafter, the secondary device is able to access the cellular network operated by the carrier, as well as make calls and send/receive text messages using the phone number associated with the eSIM profile. Although the example above is described with respect to transferring an eSIM profile from the primary device to the secondary device, a similar process is utilized to transfer the eSIM profile from the secondary device to the primary device.

Accordingly, the described techniques provide functionality for automatically initiating a transfer of an eSIM profile between devices in response to detecting that the user is transitioning to using a different device. That is, apart from providing authentication data to complete an eSIM activation process, the deactivation of the eSIM profile on one device (e.g., the secondary device) and the activation of the eSIM profile on another device (e.g., the primary device) occurs without human intervention. Due to this, the described techniques improve user experience transferring eSIM profiles between devices by preventing the user from missing time-sensitive or otherwise important electronic communications in scenarios in which the user forgets to manually initiate an eSIM profile transfer to a device that is currently in use.

While features and concepts of the described techniques for automatic eSIM transfer between devices can be implemented in any number of different devices, systems, environments, and/or configurations, implementations of the techniques for user interface adjustments for ergonomic device grip are described in the context of the following example devices, systems, and methods.

FIG. 1 illustrates an example environment 100 in which aspects of automatic eSIM transfer between devices can be implemented. Generally, the environment 100 includes a primary device 102 and a secondary device 104, which are configurable in a variety of ways. In the illustrated example, for instance, the primary device 102 is a smartphone with a display screen 106, while the secondary devices 104 include a foldable phone, a smartphone, wireless earbuds, a tablet, smart glasses, and a smart watch. However, these examples are not to be construed as limiting. Rather, the primary device 102 and the secondary device 104 are each configurable as any type of electronic, computing, and/or communication device, such as a smartphone, a mobile phone, a laptop computer, a tablet, a smart TV, a desktop computer, wireless earbuds, wireless over-ear headphones, wearable devices (e.g., smart watches, smart glasses, virtual reality/augmented reality goggles), and so on.

In one or more examples, the primary device 102 is implemented with various components, such as a processor system 108, a memory 110, and sensors 112, while the secondary device 104 is implemented with similar components, such as a processor system 114, a memory 116, and sensors 118. Examples of the sensors 112, 118 include, but are not limited to, digital cameras, microphones, global positioning system (GPS) sensors, and biometric sensors (e.g., fingerprint sensors, heartbeat sensors, digital cameras configured for iris recognition and facial recognition, microphones configured for voice recognition, and so on). The devices 102, 104 are also implemented with any number and any combination of different components, as further discussed below with reference to the example device of FIG. 7.

In one or more implementations, the primary device 102 and the secondary device 104 are communicatively linked. In various examples, the primary device 102 and the secondary device 104 are communicatively coupled over one or more networks 120, which facilitate inter-device communication over the one or more networks 120. By way of example and not limitation, the network(s) 120 include wireless cellular (e.g., 3G, 4G, 5G) networks and Wi-Fi networks (e.g., private Wi-Fi networks, public Wi-Fi networks, password-protected Wi-Fi networks, and open Wi-Fi networks).

Additionally or alternatively, the primary device 102 and the secondary device 104 are communicatively coupled via a peer-to-peer connection 122. To facilitate the peer-to-peer connection 122, the primary device 102 includes radio devices 124, and the secondary device 104 includes radio devices 126. Examples of the radio devices 124, 126 include but are not limited to Ultra-Wideband (UWB) radios, Bluetooth radios, Wi-Fi radios, and Near Field Communication (NFC) radios. In various scenarios, therefore, the peer-to-peer connection 122 enables short-range wireless communication of data between the devices 102, 104 via UWB, Bluetooth, Bluetooth Low Energy (BLE), Wi-Fi direct, and/or NFC. Additionally or alternatively, the peer-to-peer connection 122 enables long-range wireless communication of data between the devices 102, 104 via a cloud-enabled peer-to-peer connection, e.g., via cloud-based services that enable peer-to-peer connections 122 between personal devices. Additionally or alternatively, the peer-to-peer connection 122 is a wired connection which enables inter-device communication of data via the wired connection.

As shown, the primary device 102 includes an eSIM chip 128, and the secondary device 104 includes an eSIM chip 130. Generally, the eSIM chips 128, 130 are configured to store one or more eSIM profiles 132, which enable provision of services from a mobile network operator (e.g., a carrier) to the devices 102, 104. One example of information included as part of the eSIM profile 132 includes an international mobile subscriber identity (IMSI) number which uniquely identifies a subscriber to the carrier. Additionally or alternatively, the eSIM profile 132 includes additional information facilitating service provisioning from the carrier to the device, including but not limited to, security keys, network settings (e.g., an Access Point Name (APN) for mobile data), and service plan information such as a phone number associated with the user/subscriber and/or data usage allowances. When a device with an activated eSIM profile 132 connects to a cellular network 120 operated by a carrier, the cellular network 120 authenticates the user as a subscriber to the carrier using the IMSI number and security key(s) in the eSIM profile 132. This allows the device to access the cellular network 120 as well as make calls and send/receive short message service (SMS) text messages using the phone number in the eSIM profile 132.

In order to transfer a SIM profile between devices, removable SIM chip technology relies on physical removal of a SIM chip from one device, and physical placement of the SIM chip into a new device. This process is complex and time consuming as it involves the use of specialized physical tools, and in some instances, the help of an individual with experience removing and replacing SIM chips. In contrast, the eSIM chips 128, 130 are integrated circuits that are embedded directly into hardware of the devices 102, 104 and are not physically transferrable between devices. In order to transfer an eSIM profile 132 between devices, therefore, the eSIM profile 132 is deactivated (e.g., erased from memory of an eSIM chip) on a previous device, and activated (e.g., written to memory of an eSIM chip) on a new device. In other words, the eSIM chips 128, 130 enable transfer of an eSIM profile 132 between devices 102, 104 without physically removing hardware components from the devices 102, 104.

In various implementations, an eSIM profile 132 is activatable on only one device at a time. It is for this reason that transferring the eSIM profile 132 between devices 102, 104 involves deactivating the eSIM profile 132 on the eSIM chip of a previous device, and activating the eSIM profile 132 on the eSIM chip of a new device. Consider an example in which the eSIM profile 132 is to be transferred from the primary device 102 to the secondary device 104. In this example, the primary device 102 first deactivates the eSIM profile 132 by erasing the eSIM profile 132 from the eSIM chip 128, and the secondary device 104 activates the eSIM profile 132 by writing the eSIM profile 132 to the eSIM chip 130.

As part of the activation process, the secondary device 104 retrieves the eSIM profile 132 from carrier server device(s) 134 (also connected to the network(s) 120) of the carrier that operates the cellular network 120 subscribed to. In addition, the activation process involves authenticating the user on the secondary device 104, e.g., using a PIN, a password, and/or biometric data. Once the user has been successfully authenticated on the secondary device 104 as the user associated with the eSIM profile 132, the eSIM profile 132 is activated on the secondary device 104. This enables the user to access the cellular network 120 of the carrier, as well as make phone calls and send/receive text messages using the phone number associated with the eSIM profile 132. Although the example above is described as transferring the eSIM profile 132 from the primary device 102 to the secondary device 104, the eSIM profile 132 is similarly transferrable from the secondary device 104 to the primary device 102.

Accordingly, eSIM technology improves upon removable SIM technology with regard to transferring SIM functionality between devices by eliminating the complex and time consuming process of physically removing and replacing removable SIM chips. However, conventional eSIM technology relies on user input to initiate a transfer of an eSIM profile between devices. Consider an example in which the user wishes to take the secondary device 104 (e.g., a smartwatch) and not the primary device 102 (e.g., a smartphone) with the user for an outdoor workout, but the user still wishes to receive electronic communications (e.g., emails, text messages, emails, etc.) during the outdoor workout. In this example, conventionally-configured eSIM technology relies on user input to manually deactivate the eSIM profile 132 on the primary device 102, and manually activate the eSIM profile 132 on the secondary device 104. In certain scenarios, the user may forget to transfer the eSIM profile 132 to the secondary device 104 prior to the outdoor workout, and as such, the user may fail to receive time-sensitive or otherwise important electronic communications.

To alleviate the fallbacks of conventional eSIM technology, techniques for automatic eSIM transfer between devices are described herein as implemented by an eSIM transfer system 136. As shown, the eSIM transfer system 136 includes a transfer event detection module 138 and a transfer initiation module 140. Although depicted as implemented by the primary device 102, it is to be appreciated that the eSIM transfer system 136 (or an instantiation thereof) is additionally or alternatively implemented by the secondary device 104.

In one or more implementations, the eSIM transfer system 136, the transfer event detection module 138, and the transfer initiation module 140 (i.e., "the systems and modules") include processing, memory, and/or logic components (e.g., implemented in circuitry) of the devices 102, 104. Additionally or alternatively, the systems and modules are implemented in software, in hardware, or as a combination of software and hardware components. Additionally or alternatively, the systems and modules are implemented as software application(s) and/or algorithms embodied in executable software instructions stored on computer-readable storage memory (e.g., the memory 110, 116) of the devices 102, 104, which are executable by a processor (e.g., the processor system 108, 114) of the devices 102, 104. Additionally or alternatively, the systems and modules are implemented in firmware and/or at least partially in computer hardware, e.g., at least part of the systems and modules are implemented as software instructions executable by processors of the devices 102, 104 and/or at least part of the systems and modules are implemented in logic circuitry of the devices 102, 104.

The transfer event detection module 138 is representative of functionality for detecting a transfer event indicating that the user is transitioning from using the primary device 102 to using the secondary device 104, and vice versa. The transfer event is detected in any one or more of a variety of manners, as further discussed below with reference to FIG. 2. Generally, different devices 102, 104 are used in different contexts, and the transfer event detection module 138 detects a transfer event by determining that a current context of the devices 102, 104 matches a context in which a particular device is typically used.

The transfer initiation module 140 is representative of functionality for automatically initiating a transfer of the eSIM profile 132 between the devices 102, 104 responsive to a transfer event being detected. When the transfer event indicates a transition from the primary device 102 to the secondary device 104, the transfer initiation module 140 causes deactivation of the eSIM profile 132 on the eSIM chip 128 of the primary device 102 and activation of the eSIM profile 132 on the eSIM chip 130 of the secondary device 104, as illustrated. When the transfer event indicates a transition from the secondary device 104 to the primary device 102, the transfer initiation module 140 causes deactivation of the eSIM profile 132 on the eSIM chip 130 of the secondary device 104 and activation of the eSIM profile 132 on the eSIM chip 128 of the primary device 102.

Accordingly, the described techniques provide functionality for automatically initiating a transfer of the eSIM profile 132 between the devices 102, 104 responsive to a determination that the user is transitioning to using a different device. In contrast to conventional eSIM technology, the described techniques do not rely on user input to initiate the transfer of the eSIM profile 132. That is, apart from the user providing authentication data to complete the eSIM profile 132 activation process, the transfer of the eSIM profile 132 between devices 102, 104 occurs without human intervention. Due to this, the described techniques improve user experience transferring eSIM profiles between devices by preventing scenarios in which the user forgets to manually initiate an eSIM profile transfer to a device that is currently in use. This prevents the user from missing time-sensitive or otherwise important electronic communications.

Figure 2:
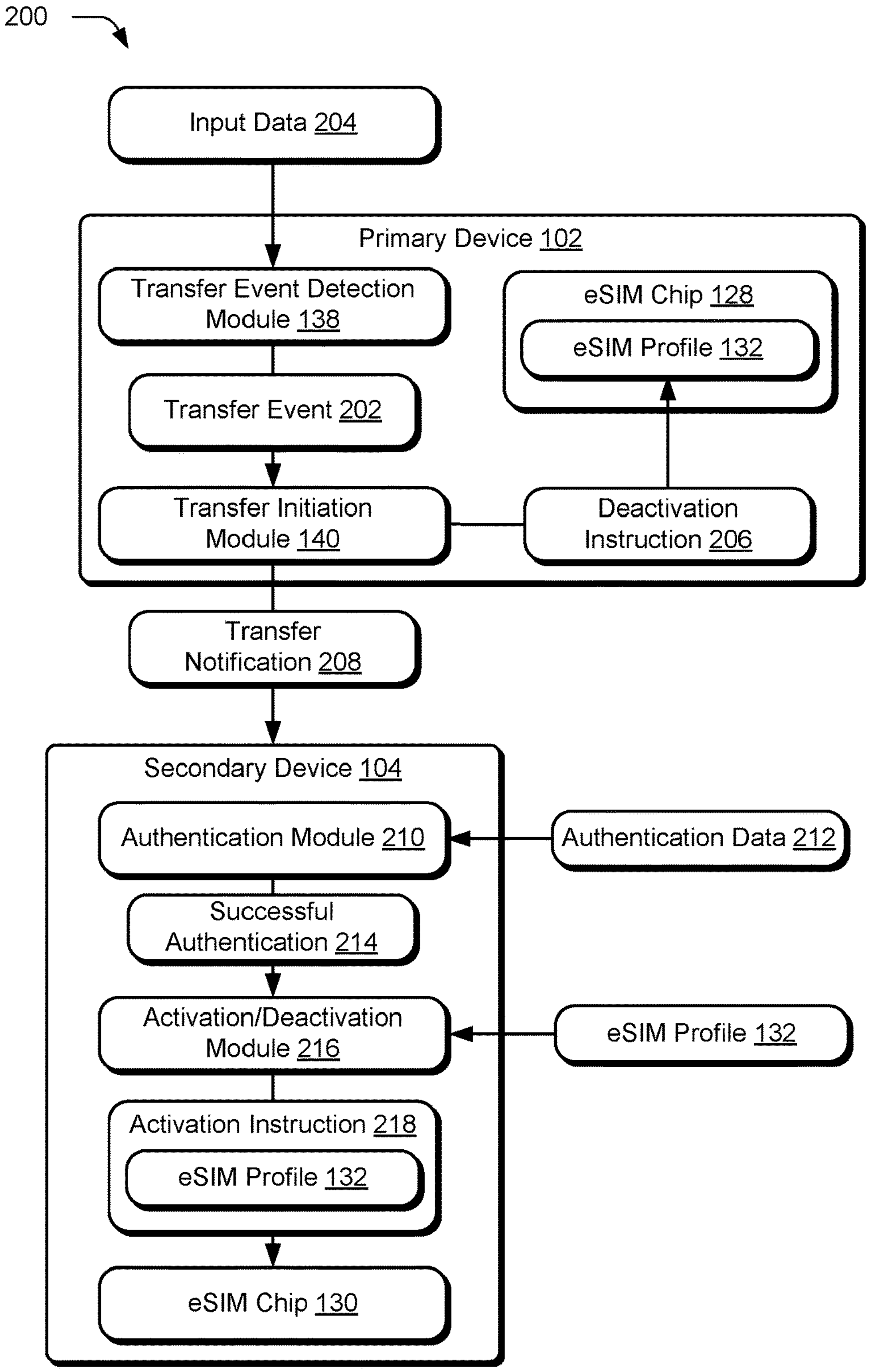
FIG. 2 depicts an example system in which aspects of automatic eSIM transfer between devices can be implemented to transfer an eSIM profile to a secondary device.

FIG. 2 depicts an example system 200 in which aspects of automatic eSIM transfer between devices can be implemented to transfer an eSIM profile to a secondary device. In the system 200, the eSIM profile 132 is initially activated on the primary device 102. Broadly, the transfer event detection module 138 detects a transfer event 202 indicating that the user is transitioning from using the primary device 102 to using the secondary device 104, and the transfer initiation module 140 initiates a transfer of the eSIM profile 132 from the primary device 102 to the secondary device 104.

In one or more implementations, the user registers the devices 102, 104 with the eSIM profile 132 in order to enable automatic transferring of the eSIM profile 132 between the registered devices 102, 104. By way of example, the user provides user input, via an automatic eSIM transfer settings menu (e.g., displayed on the display screen 106 of the primary device 102), specifying the devices 102, 104 that are to participate in automatic eSIM profile 132 transfer. Given this, the transfer event detection module 138 only detects transfer events 202 with respect to the registered devices 102, 104, and the transfer initiation module 140 only initiates transfers of the eSIM profile 132 between the registered devices 102, 104.

In accordance with the described techniques, the transfer event detection module 138 receives input data 204 (from the sensors 112, from the secondary devices 104, the network(s) 120, and/or the memory 110), and detects a transfer event 202 based on the input data 204. In at least one example, registering of the devices 102, 104 for participation in automatic transfer of the eSIM profile 132 enables periodic communications of input data 204 between the devices 102, 104. As further described below, the input data 204 includes user proximity data indicating a proximity of the user to the devices 102, 104, device ranging data indicating a relative distance between the devices 102, 104, network connection data indicating the devices 102, 104 currently connected to a trusted local network 120, device usage data indicating days, times of day, and physical locations associated with usage of the devices 102, 104, calendar data of the user indicating days and times of day associated with user activities, and registration data indicating days, times of day, and/or physical locations registered, via user input, with the devices 102, 104.

In one or more implementations, the transfer event detection module 138 detects the transfer event 202 based on the user being proximate to the secondary device 104 while the primary device 102 is at least a threshold distance from the secondary device 104. As part of this, the secondary device 104 detects that the user is proximate to the secondary device 104 using the sensors 118. In one or more implementations, the proximity detection includes a detection of the user using biometric recognition techniques, such as fingerprint recognition, iris recognition, facial recognition, and/or voice recognition. In the case of a wearable device, the proximity detection includes a detection of the wearable device being worn by a user, e.g., by detecting a heartbeat via a heartbeat sensor. Additionally or alternatively, the secondary device 104 uses proximity sensors to detect that the user is within a threshold distance of the secondary device 104. Upon detecting that the user is proximate to the secondary device 104, the secondary device 104 communicates, to the primary device 102, an indication that the user is proximate to the secondary device 104.

In addition, the primary device 102 determines a relative distance between the primary device 102 and the secondary device 104. Any one or more of a variety of techniques are usable to determine a relative distance between the devices 102, 104. In one example, the primary device 102 determines the distance using UWB ranging techniques by calculating the distance based on UWB ranging signals (e.g., time-of-flight (ToF), angle-of-arrival (AoA), and/or time-difference-of-arrival (TDoA)) exchanged between the devices 102, 104. In another example, the primary device 102 receives a GPS location from the secondary device 104 and calculates a difference between a GPS location of the secondary device 104 and a GPS location of the primary device 102. If the distance between the devices 102, 104 is greater than a threshold while the user is detected as proximate to the secondary device 104, the transfer event detection module 138 detects a transfer event 202.

Additionally or alternatively, in implementations in which the primary device 102 and the secondary device 104 are connected to a trusted local network 120 (e.g., a home Wi-Fi network 120), the transfer event detection module 138 detects the transfer event 202 based on the secondary device 104 disconnecting from the trusted local network 120 while the user is detected as proximate to the secondary device 104. By way of example, the secondary device 104 detects that the user is proximate to the secondary device 104 and communicates an indication thereof to the primary device 102, as further discussed above. While the user is detected as proximate to the secondary device 104, the primary device 102 receives an indication that the secondary device 104 has disconnected from the trusted local network 120. Based on the received indications of user proximity to the secondary device 104 and disconnection of the secondary device 104 from the trusted local network 120, the transfer event detection module 138 detects a transfer event 202. In one or more implementations, the transfer event 202 is only detected if the primary device 102 remains connected to the trusted local network 120 after a threshold amount of time has elapsed since the disconnection of the secondary device 104.

Additionally or alternatively, the transfer event detection module 138 detects the transfer event 202 based on a current day, a current time, and/or a current physical location of the secondary device 104 matching previous device usage patterns associated with the secondary device 104. As part of this, the eSIM transfer system 136 collects device usage data from the secondary device 104 indicating days, times of day, and physical locations associated with usage of the secondary device 104. Usage of a device 102, 104 is detectable in any one or more of a variety of ways, such as the device 102, 104 being powered up, the device 102, 104 transitioning from an idle (e.g., locked) state to an active (e.g., unlocked) state, the device transitioning from a stationary state to a mobile state (e.g., based on GPS data and/or gyrometer data indicative of motion), inputs to the device 102, 104 being received at greater than or equal to a threshold rate, a usage session being initiated by the user (e.g., an input to begin tracking a workout using a wearable device), etc.

Based on the collected device usage data, the eSIM transfer system 136 detects a pattern of usage of the secondary device 104 indicating days, times of day, and/or physical locations in which the secondary device 104 is typically used. For example, the pattern is detected as the secondary device 104 being used at least a threshold percentage of occurrences of a particular day of the week (e.g., Tuesdays) and/or occurrences of a particular time of day (e.g., between 4:00 PM and 6:00 PM). As an additional example, the pattern is detected as the secondary device 104 being used at least a threshold percentage of occurrences when the user is present at a particular physical location. Finally, the transfer event detection module 138 detects the transfer event 202 by matching a current day, time of day, and/or physical location of the secondary device 104 with a previously detected pattern of usage of the secondary device 104.

Consider an example in which the secondary devices 104 include a smartwatch used to track exercise metrics during workouts that the user performs directly after finishing his or her workday at a gym that the user is a member of. Given this, the device usage data associated with the smartwatch indicates usage of the smartwatch on weekdays, between the hours of 4:00 PM and 6:00 PM, and at a particular geographical location associated with the gym. In this example, the transfer event detection module 138 detects, as a transfer event 202 for the smartwatch, the smartwatch being positioned at the particular geographical location (e.g., the gym) on a weekday between the hours of 4:00 PM and 6:00 PM.

Additionally or alternatively, the transfer event detection module 138 detects the transfer event 202 based on a current day and/or a current time of day matching calendar data indicative of a user activity associated with the secondary device 104. As part of this, the eSIM transfer system 136 receives calendar data (e.g., from a calendar application of the primary device 102) indicating activities scheduled on particular days and at particular times. By way of example, the calendar data includes a particular user activity (e.g., "biking") scheduled on particular days and at particular times.

If the device usage data of the secondary device 104 indicates usage of the secondary device 104 during the days/times of day that the activity is scheduled, then the eSIM transfer system 136 associates the secondary device 104 with the user activity. In one or more implementations, the association of the secondary device 104 with the user activity occurs after usage of the secondary device 104 is detected during at least a threshold number of scheduled events indicative of the user activity in the calendar data. Subsequent events indicative of the user activity in the calendar data are therefore detected as transfer events 202 by the transfer event detection module 138. In one or more implementations, natural language processing (NLP) techniques are leveraged by the transfer event detection module 138 to process text in the calendar data in order to recognize similar terminology (e.g., "cycling" and "biking") as a common user activity.

Additionally or alternatively, the eSIM transfer system receives user input (e.g., via the automatic eSIM transfer settings menu) registering the secondary device 104 with particular physical locations, particular days, and/or particular times of day. By way of example, a smartwatch of the user is registered with a particular physical location (e.g., the gym), while a smartphone that the user uses for work purposes is registered with weekdays between the hours of 9:00 AM and 5:00 PM. Given this, the transfer event detection module 138 detects, as a transfer event 202 for the smartwatch, the smartwatch being positioned at the particular physical location (e.g., the gym). Furthermore, the transfer event detection module 138 detects, as a transfer event 202 for the work smartphone, a current day and time of day being a weekday between the hours of 9:00 AM and 5:00 PM.

The specific examples of the transfer event 202 discussed above are not to be construed as limiting. Indeed, the transfer event 202 can be detected as any combination of one or more of the aforementioned examples of the transfer event 202. In addition, the transfer event 202 can be detected as any other event indicative of the user transitioning from using the primary device 102 to using the secondary device 104, without departing from the spirit or scope of the described techniques.

As shown, an indication of the transfer event 202 is provided to the transfer initiation module 140, which automatically initiates a transfer of the eSIM profile 132 from the primary device 102 to the secondary device 104. In one or more implementations, the transfer initiation module 140 initiates the transfer by, automatically and without human intervention, initiating a deactivation of the eSIM profile 132 on the eSIM chip 128 of the primary device 102 and initiating an activation of the eSIM profile 132 on the eSIM chip 130 of the secondary device 104. For example, the deactivation of the eSIM profile 132 on the primary device 102 and the activation of the eSIM profile 132 on the secondary device 104 occur without human intervention apart from the user providing authentication information as part of an authentication process on the secondary device 104.

Alternatively, the transfer initiation module 140 initiates the transfer by displaying, via the display screen 106 of the primary device 102, a first user interface element that is selectable to initiate the transfer, and a second user interface element that is selectable to decline the transfer. Responsive to receiving a user selection of the first user interface element, the transfer initiation module 140 initiates a deactivation of the eSIM profile 132 on the eSIM chip 128 of the primary device 102 and initiates an activation of the eSIM profile 132 on the eSIM chip 130 of the secondary device 104. Responsive to receiving a user selection of the second user interface element, the transfer initiation module 140 refrains from initiating the transfer, and the eSIM profile 132 remains activated on the eSIM chip 128 of the primary device 102. In various examples, a setting is specified via the automatic eSIM transfer menu indicating that a manual confirmation of eSIM transfer is to be provided before an eSIM profile is transferred between devices 102, 104.

Regardless of whether the transfer is initiated automatically or based on a user confirmation, the transfer initiation module 140 issues a deactivation instruction 206 causing deactivation of the eSIM profile 132 on the eSIM chip 128 of the primary device 102. In response to the deactivation having completed, the transfer initiation module 140 communicates a transfer notification 208 to the secondary device 104, as shown. The transfer notification 208 is representative of a request to complete a transfer of the eSIM profile 132 from the primary device 102 to the secondary device 104, and indicates that the eSIM profile 132 has already been deactivated on the eSIM chip 128 of the primary device 102. More specifically, the transfer notification 208 is representative of a request to activate the eSIM profile 132 on the eSIM chip 130 of the secondary device 104.

Once the transfer notification is received by the secondary device 104, the secondary device 104 initiates an authentication of the user on the secondary device 104. To do so, an authentication module 210 collects authentication data 212 from the user (e.g., using the sensors 118 and/or input devices such as a touch-sensitive display, keyboard, and mouse), and compares the collected authentication data 212 to known authentication data of the user, e.g., stored in memory 116. In various examples, the authentication data 212 includes a PIN, a password, answers to previously provided security questions, and/or biometric data, such as fingerprint data, facial recognition data, iris recognition data, and voice recognition data. Additionally or alternatively, the authentication data 212 is an authentication code (e.g., of numbers) or a QR code provided by the carrier that is sent to an email address associated with the user or displayed on the primary device 102. In these implementations, the authentication is based on entry of the authentication code on the secondary device 104 or scanning of the QR code via a camera of the secondary device 104. An activation process is initiated on the secondary device 104 in response to a successful authentication 214 of the user based on the collected authentication data 212.

As previously mentioned, the primary device 102 and the secondary device 104 are communicatively coupled via a peer-to-peer connection 122. In one or more implementations, the authentication module 210 selects different authentication methods based on a type of peer-to-peer connection 122 between the primary device 102 and the secondary device 104. By way of example and not limitation, the types of peer-to-peer connections 122 between devices 102, 104 are grouped from most secure to least secure in the following order: (1) wired peer-to-peer connections 122, (2) short range wireless peer-to-peer connections 122, such as a Bluetooth connection, a BLE connection, a UWB connection, a Wi-Fi direct connection, and an NFC connection, and (3) long range wireless peer-to-peer connections 122 such as a cloud-enabled peer-to-peer connection.

Given the above, the authentication module 210 uses multi-factor authentication in which more secure peer-to-peer connections 122 between the devices 102, 104 utilize fewer factors of authentication, while less secure peer-to-peer connections 122 between the devices 102, 104 utilize more factors of authentication. By way of example, the authentication module 210 utilizes one factor of authentication for wired peer-to-peer connections 122—either a password, a PIN, entry of a carrier-provided authentication code, scanning of a carrier-provided QR code, or a biometric authentication. Further, the authentication module 210 utilizes two factors of authentication for the short-range wireless peer-to-peer connections 122—a biometric authentication, and one of a password, a PIN, entry of a carrier-provided authentication code, or scanning of a carrier-provided QR code. Moreover, the authentication module 210 utilizes three factors of authentication for long-range wireless peer-to-peer connections—a biometric authentication, correctly answering or more security questions, and one of a password, a PIN, entry of a carrier-provided authentication code, or scanning of a carrier-provided QR code.

To ensure a secure transfer of the eSIM profile 132, the authentication module 210 can deny a transfer of the eSIM profile 132 if the devices 102, 104 are not connected via a peer-to-peer connection 122, e.g., the devices 102, 104 are solely communicatively coupled via the network(s) 120. Additionally or alternatively, if the devices 102, 104 are not connected via a peer-to-peer connection 122, the secondary device 104 can output a prompt (e.g., visually via a display screen or audibly via a speaker) in response to receiving the transfer notification 208. The prompt requests the user to connect the devices 102, 104 via a peer-to-peer connection 122 to enable a transfer of the eSIM profile 132 between devices 102, 104.

As shown, an indication of the successful authentication 214 is received by an activation/deactivation module 216 of the secondary device 104, which is representative of functionality for activating and deactivating the eSIM profile 132 on the secondary device 104. In response to receiving the successful authentication 214, the activation/deactivation module 216 obtains the eSIM profile 132, via communication over the network(s) 120, from the carrier server device (s) 134. Further, the activation/deactivation module 216 issues an activation instruction 218 which causes the retrieved eSIM profile 132 to be written to the eSIM chip 130 on the secondary device 104. After the eSIM profile 132 is written to the eSIM chip 130, the secondary device 104 is able to access the cellular network 120 operated by the carrier, as well as make calls and send/receive text messages using the phone number in the eSIM profile 132.

FIG. 3 depicts an example system in which aspects of automatic eSIM transfer between devices can be implemented to transfer an eSIM profile to a primary device. In the system 300, the eSIM profile 132 is initially activated on the secondary device 104. Broadly, the transfer event detection module 138 detects a transfer event 202 indicating that the user is transitioning from using the secondary device 104 to using the primary device 102, and the transfer initiation module 140 initiates a transfer of the eSIM profile 132 from the secondary device 104 to the primary device 102.

In accordance with the described techniques, the transfer event detection module 138 receives input data 204 (e.g., from the sensors 112, from the secondary devices 104, the network(s) 120, and/or the memory 110), and detects a transfer event 202 based on the input data 204. Notably, the input data 204 includes any of the input data 204 discussed above with reference to FIG. 2, and the transfer event 202 is detected in any one or more of the manners discussed above with reference to FIG. 2.

By way of example, the transfer event 202 is detected based on the user being detected as proximate to the primary device 102 while the secondary device 104 is at least a threshold distance from the primary device 102. Additionally or alternatively, the transfer event 202 is detected as the primary device 102 disconnecting from a trusted local network 120 while the user is detected as proximate to the primary device 102. Additionally or alternatively, after the eSIM profile 132 was transferred based on the secondary device 104 disconnecting from the trusted local network 120, the transfer event 202 is detected as the user being proximate to the primary device 102 after the secondary device 104 has reconnected to the trusted local network 120. Additionally or alternatively, the transfer event 202 is detected as a current day, a current time of day, and/or a current physical location of the primary device 102 matching a day, time of day, and/or a physical location registered, via user input, with the primary device 102.

Additionally or alternatively, the transfer event 202 is detected as a current day, a current time of day, and/or a current physical location of the primary device 102 matching previous device usage patterns associated with the primary device 102. Here, the previous device usage patterns are detected based on device usage data of the primary device 102 indicating days, times of day, and/or physical locations in which the primary device 102 is typically used. Additionally or alternatively, the transfer event 202 is detected based on a current day and/or a current time of day matching calendar data indicative of a user activity associated with the primary device 102. Here, the user activity is associated with the primary device 102 based on device usage data indicating usage of the primary device 102 during previously calendared events indicative of the user activity.

An indication of the transfer event 202 is received by the transfer initiation module 140, which communicates a transfer notification 302 to the secondary device 104. Here, the transfer notification 302 is representative of a request to transfer the eSIM profile 132 from the secondary device 104 to the primary device 102. Notably, the transfer notification 302 of FIG. 3 differs from the transfer notification 208 of FIG. 2 because the transfer notification 302 requests the secondary device 104 to deactivate the eSIM profile 132 that is currently activated on the eSIM chip 130 of the secondary device 104. In contrast, the transfer notification 208 indicates that the eSIM profile 132 has already been deactivated on the eSIM chip 128 of the primary device 102, and requests the secondary device 104 to activate the eSIM profile 132 on the eSIM chip 130 of the secondary device 104.

In response to receiving the transfer notification 302, the activation/deactivation module 216 issues a deactivation instruction 206, which causes deactivation of the eSIM profile 132 on the eSIM chip 130 of the secondary device 104. After the deactivation process, the secondary device 104 communicates a deactivation notification 304 to the primary device 102. Once the deactivation notification 304 is received by the primary device 102, an authentication module 306 of the primary device 102 initiates an authentication of the user on the primary device 102. To do so, the authentication module 306 collects authentication data 212, which can be any one or more of the aforementioned types of authentication data 212 discussed above with reference to FIG. 2.

Similar to the authentication module 210 of the secondary device 104, the authentication module 306 of the primary device 102 may utilize different authentication methods based on a type of communicative coupling between the devices 102, 104. One example of this includes utilizing fewer factors of authentication for more secure types of peer-to-peer connections 122 between the devices 102,104, and utilizing more factors of authentication for less secure types of peer-to-peer connections 122 between the devices 102, 104, as further discussed with reference to FIG. 2. As shown, the authentication module 306 communicates an indication of a successful authentication 214 to the transfer initiation module 140 in response to successfully authenticating the user based on the collected authentication data 212.

In response to receiving the indication of the successful authentication 214, the transfer initiation module 140 retrieves, via communication over the network(s) 120, the eSIM profile 132 from the carrier server device(s) 134. Further, the transfer initiation module 140 issues an activation instruction 218 which causes the retrieved eSIM profile 132 to be written to the eSIM chip 128 of the primary device 102. After the eSIM profile 132 is written to the eSIM chip 128, the primary device 102 is able to access the cellular network 120 operated by the carrier, as well as make calls and send/receive text messages using the phone number in the eSIM profile 132.

As previously mentioned, the secondary device 104 includes the eSIM transfer system 136 (or an instantiation thereof) in one or more implementations. In these implementations, the secondary device 104 operates as the primary device 102 in FIG. 2 to facilitate the transfer of the eSIM profile 132 from the secondary device 104 to the primary device 102. Indeed, as an alternative to the above-described process in which the transfer of the eSIM profile 132 is controlled by the primary device 102, the secondary device 104 detects the transfer event 202, deactivates the eSIM profile 132 on the secondary device 104, and communicates the transfer notification 208 to the primary device 102 requesting activation of the eSIM profile 132 on the primary device 102.

Although examples are described above in which the eSIM profile 132 is transferred from the primary device 102 to the secondary device 104, and from the secondary device to the primary device 102, it is to be appreciated that the eSIM profile is similarly transferrable between multiple secondary devices 104. Consider an example in which a transfer event 202 is detected indicating that the user is transitioning from using a first secondary device 104 to using a second secondary device 104. In this example, the first secondary device 104 and/or the second secondary device 104 include the eSIM transfer system 136 (or an instantiation thereof), and one of the secondary devices 104 acts as the primary device 104 in FIG. 2 or FIG. 3 to facilitate the transfer of the eSIM profile 132 from the first secondary device 104 to the second secondary device 104.

Additionally or alternatively, the first and second secondary devices 104 do not include an eSIM transfer system 136 (or an instantiation thereof), and the primary device 104 facilitates the transfer of the eSIM profile 132 from the first secondary device 104 to the second secondary device 104. For instance, the primary device 102 detects a transfer event 202 in accordance with the described techniques, and communicates an instruction to the first secondary device 104 requesting the first secondary device 104 to deactivate the eSIM profile 132. Further, the primary device 102 receives a deactivation notification 304 from the first secondary device 104, and communicates an instruction to the second secondary device 104 requesting the second secondary device 104 to initiate an authentication process, and then activate the eSIM profile 132 responsive to a successful authentication 214.

Figure 4A:
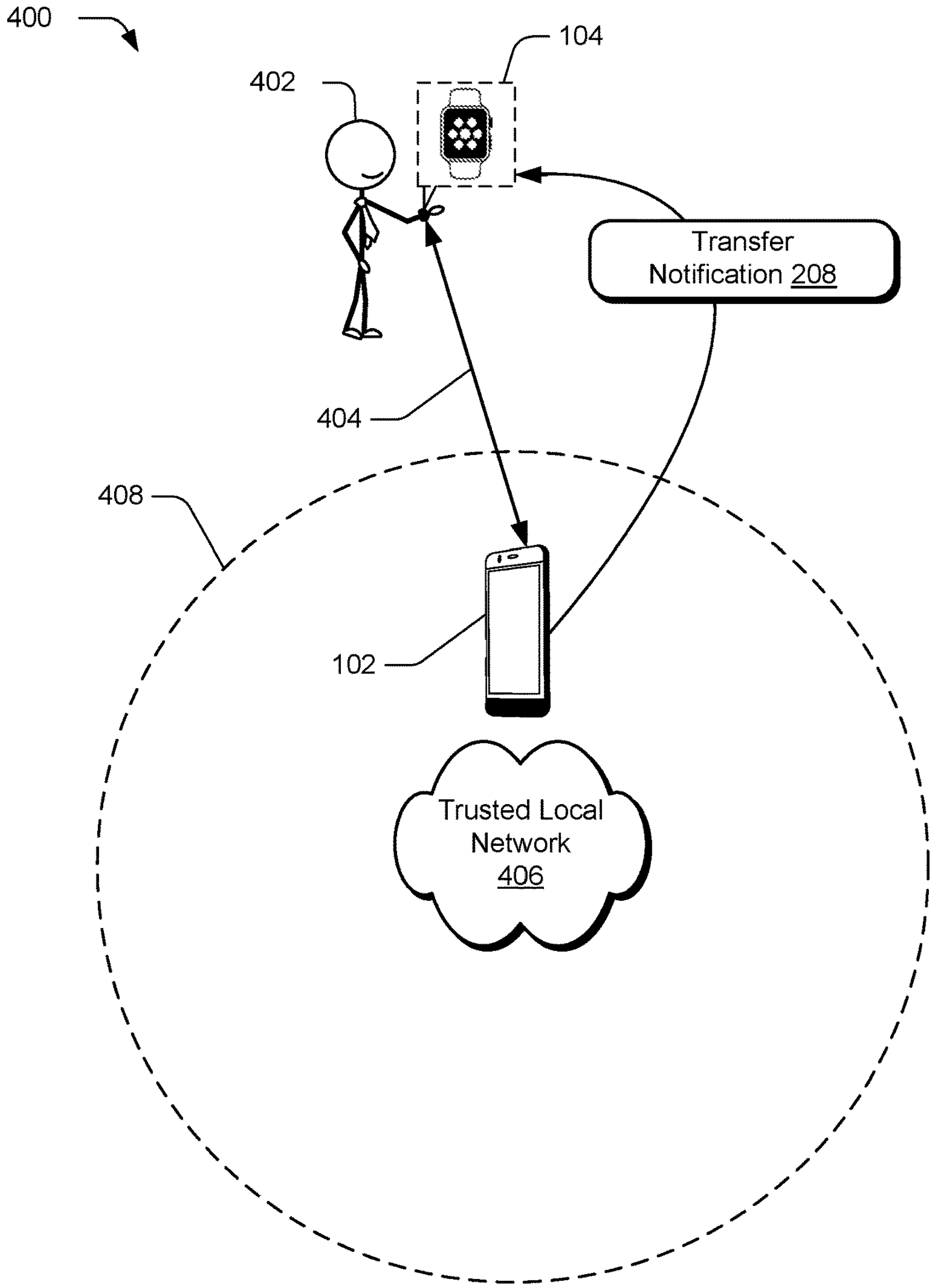
FIG. 4*a* depicts an example of a transfer of an eSIM profile being initiated from a primary device to a secondary device.

FIG. 4*a* depicts an example 400 of a transfer of an eSIM profile being initiated from a primary device to a secondary device. In the example 400, the eSIM profile 132 is initially activated on the primary device 102.

Here, the transfer event detection module 138 receives an indication of proximity of a user 402 to the secondary device 104. By way of example, the secondary device 104 is a wearable smartwatch, and the proximity of the user 402 is detected based on a heartbeat being detected via a heartbeat sensor of the secondary device 104. Additionally or alternatively, the transfer event detection module 138 determines a relative distance 404 between the devices 102, 104, e.g., based on UWB ranging signals exchanged between the devices 102, 104. Additionally or alternatively, the transfer event detection module 138 receives an indication that the secondary device 104 has disconnected from a trusted local network 406, e.g., as illustrated by the secondary device 104 being located outside a range 408 of the trusted local network 406.

Based on one or more of the received indication of user proximity to the secondary device 104, the relative distance between the devices 102, 104 equaling or exceeding a threshold, and the disconnection of the secondary device 104 from the trusted local network 406, the transfer initiation module 140 deactivates the eSIM profile 132 on the primary device 102. After this, the transfer initiation module 140 communicates the transfer notification 208 to the secondary device 104, which causes the secondary device 104 to authenticate the user, and then activate the eSIM profile 132 on the secondary device 104 responsive to a successful authentication 214.

Figure 4B:
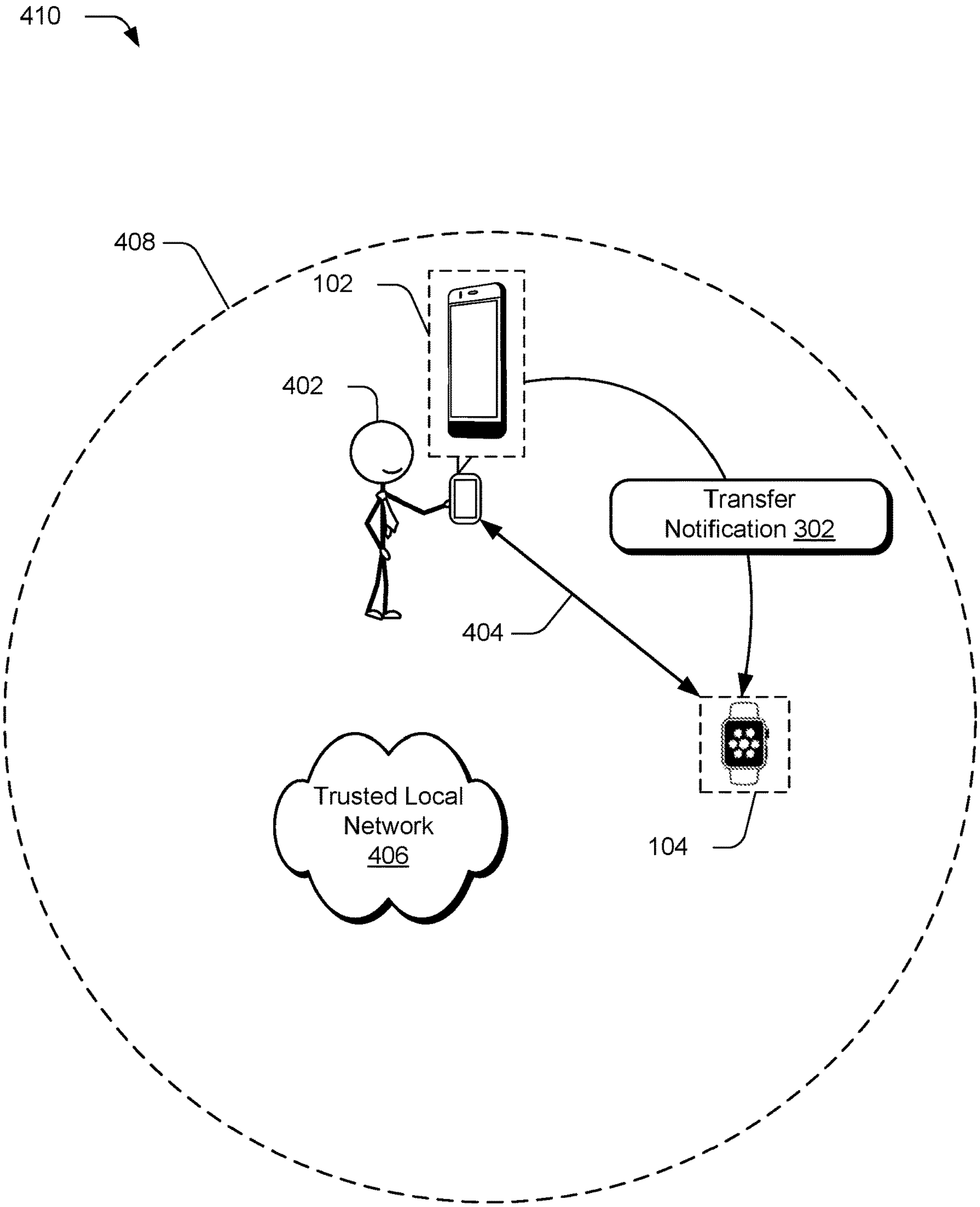
FIG. 4*b* depicts an example of a transfer of an eSIM profile being initiated from a secondary device to a primary device.

FIG. 4*b* depicts an example 410 of a transfer of an eSIM profile being initiated from a secondary device to a primary device. In the example 410, the eSIM profile 132 is initially activated on the secondary device 104.

Here, the transfer event detection module 138 receives an indication of proximity of the user 402 to the primary device 102. By way of example, the proximity of the user 402 is detected based on a biometric recognition of the user 402 on the primary device 102, e.g., fingerprint recognition, facial recognition, iris recognition, and/or voice recognition. Additionally or alternatively, the transfer event detection module 138 determines a relative distance 404 between the devices 102, 104, e.g., based on UWB ranging signals exchanged between the devices 102, 104. Additionally or alternatively, the transfer event detection module 138 receives an indication that the secondary device 104 has reconnected to a trusted local network 406, e.g., as illustrated by the secondary device 104 being located within a range 408 of the trusted local network 406.

Based on one or more of the detection of user proximity to the primary device 102, the relative distance between devices 102, 104 equaling or exceeding a threshold, and the reconnection of the secondary device 104 to the trusted local network 406, the transfer initiation module 140 communicates the transfer notification 302 to the secondary device 104. The transfer notification 302 causes the secondary device 104 to deactivate the eSIM profile 132 on the secondary device 104, and communicate a deactivation notification 304 to the primary device 102 in response. The deactivation notification 304 causes the primary device 102 to authenticate the user 402, and then activate the eSIM profile 132 on the primary device 102 responsive to a successful authentication 214.

FIG. 5 is an example method 500 for automatic eSIM transfer between devices, as implemented by a primary device. For instance, the example method 500 is implemented by the primary device 102. The order in which the method 500 is described is not intended to be construed as a limitation, and any number or combination of the described method operations can be performed in any order to perform a method, or an alternate method.

While an eSIM profile associated with a user is activated on a first eSIM chip of a primary device, it is determined that the user is transitioning from using the primary device to using a secondary device (block 502). While the eSIM profile 132 is activated on the eSIM chip 128 of the primary device 102, for instance, the transfer event detection module 138 detects a transfer event 202 indicating that the user is transitioning from using the primary device 102 to using the secondary device 104.

A transfer of the eSIM profile is initiated from the primary device to the secondary device, the transfer causing deactivation of the eSIM profile on the first eSIM chip and activation of the eSIM profile on a second eSIM chip of the secondary device (block 504). In response to the transfer event 202 being detected, for instance, the transfer initiation module 140 deactivates the eSIM profile 132 on the eSIM chip 128 of the primary device 102. Further, the transfer initiation module 140 communicates the transfer notification 208 to the secondary device 104, which initiates an authentication process of the user on the secondary device 104. In response to a successful authentication 214 of the user on the secondary device 104, the eSIM profile 132 is activated on the eSIM chip 130 of the secondary device 104.

While the eSIM profile is activated on the second eSIM chip, it is determined that the user is transitioning from using the secondary device to using the primary device (block 506). While the eSIM profile 132 is activated on the eSIM chip 130 of the secondary device 104, for instance, the transfer event detection module 138 detects an additional transfer event 202 indicating that the user is transitioning from using the secondary device 104 to using the primary device 102.

An additional transfer of the eSIM profile is initiated from the secondary device to the primary device, the additional transfer causing deactivation of the eSIM profile on the second eSIM chip and activation of the eSIM profile on the first eSIM chip (block 508). In response to the additional transfer event 202 being detected, for instance, the transfer initiation module 140 communicates the transfer notification 302 to the secondary device 104, which prompts the secondary device 104 to deactivate the eSIM profile 132 on the eSIM chip 130. After doing so, the secondary device 104 communicates the deactivation notification 304 to the primary device 102, which initiates an authentication process of the user on the primary device 102. In response to a successful authentication of the user on the primary device 102, the transfer initiation module 140 activates the eSIM profile 132 on the eSIM chip 128 of the primary device 102.

FIG. 6 is an example method 600 for automatic eSIM transfer between devices, as implemented by a secondary device. For instance, the example method 600 is implemented by the secondary device 104. The order in which the method 600 is described is not intended to be construed as a limitation, and any number or combination of the described method operations can be performed in any order to perform a method, or an alternate method.

While an eSIM profile associated with a user is activated on a first eSIM chip of a primary device, a transfer notification is received requesting to transfer the eSIM profile from the primary device to a secondary device based on a determination that the user is transitioning from using the primary device to using the secondary device, the transfer notification indicating that the eSIM profile has been deactivated on the first eSIM chip (block 602). While the eSIM profile 132 is activated on the primary device 102, for instance, the secondary device 104 receives a transfer notification 208 from the primary device 102. The transfer notification 208 indicates that a transfer event 202 has been detected indicating that the user is transitioning from using the primary device 102 to using the secondary device 104. In addition, the transfer notification 208 indicates that the eSIM profile 132 has been deactivated on the eSIM chip 128 of the primary device 102.

The eSIM profile is activated on a second eSIM chip of the secondary device (block 604). In response to receiving the transfer notification 208, for instance, the authentication module 210 initiates an authentication of the user on the secondary device 104. After a successful authentication 214, the activation/deactivation module 216 initiates an activation of the eSIM profile 132 on the eSIM chip 130 of the secondary device 104.

While the eSIM profile is activated on the second eSIM chip, an additional transfer notification is received requesting to transfer the eSIM profile from the secondary device to the primary device based on an additional determination that the user is transitioning from using the secondary device to using the primary device (block 606). While the eSIM profile 132 is activated on the secondary device 104, for instance, the secondary device 104 receives an additional transfer notification 302 from the primary device 102. The additional transfer notification 302 indicates that a transfer event 202 has been detected indicating that the user is transitioning from using the secondary device 104 to using the primary device 102.

The eSIM profile is deactivated on the second eSIM chip of the secondary device, thereby enabling activation of the eSIM profile on the first eSIM chip of the primary device (block 608). In response to receiving the additional transfer notification 302, for instance, the activation/deactivation module 216 deactivates the eSIM profile 132 on the eSIM chip 130 of the secondary device 104. After the deactivation process, the secondary device 104 communicates a deactivation notification 304 to the primary device 102, which prompts the authentication module 306 of the primary device 102 to authenticate the user. In response to a successful authentication 214 of the user, the eSIM profile 132 is activated on the eSIM chip 128 of the primary device 102.

Figure 7:
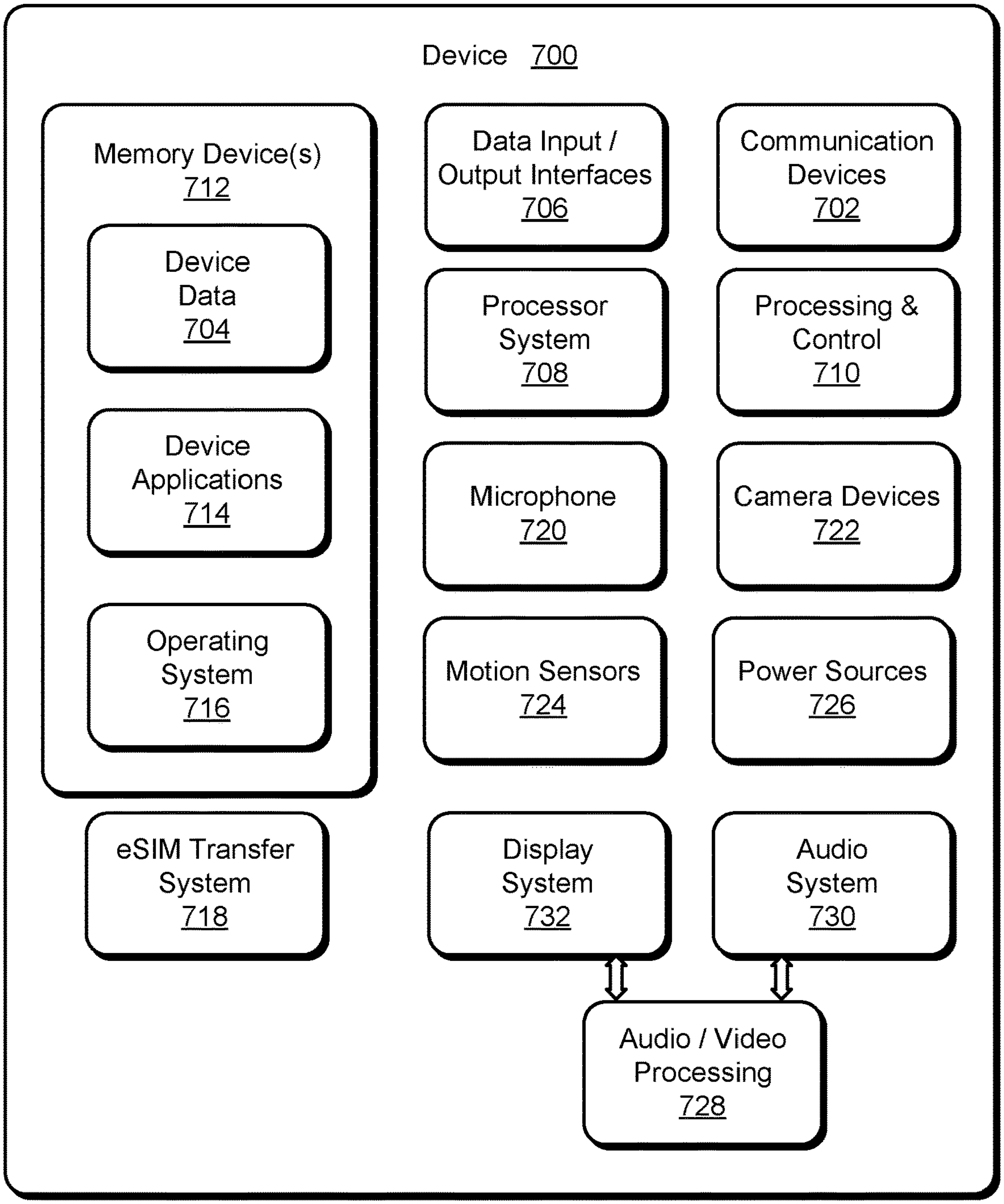
FIG. 7 illustrates various components of an example device that can implement aspects of automatic eSIM transfer between devices.

FIG. 7 illustrates various components of an example device 700 which can implement aspects of the techniques and features for automatic eSIM transfer between devices, as described herein. The example device 700 can be implemented as any of the devices described with reference to the previous FIGS. 1-6, such as any type of a wireless device, mobile device, mobile phone, flip phone, client device, companion device, paired device, display device, audio output device, wireless headphones, wireless earbuds, wireless hearing aids, tablet, computing, communication, entertainment, gaming, media playback, and/or any other type of computing and/or electronic device. For example, the primary device 102, the secondary device 104, and/or the carrier server device(s) 134 described with reference to FIGS. 1-6 may be implemented as the example device 700.

The example device 700 can include various, different communication devices 702 that enable wired and/or wireless communication of device data 704 with other devices. The device data 704 can include any of the various devices data and content that is generated, processed, determined, received, stored, and/or communicated from one computing device to another. Generally, the device data 704 can include any form of audio, video, image, graphics, and/or electronic data that is generated by applications executing on a device. The communication devices 702 can also include transceivers for cellular phone communication and/or for any type of network data communication.

The example device 700 can also include various, different types of data input/output (I/O) interfaces 706, such as data network interfaces that provide connection and/or communication links between the devices, data networks, and other devices. The I/O interfaces 706 can be used to couple the device to any type of components, peripherals, and/or accessory devices, such as a computer input device that may be integrated with the example device 700. The I/O interfaces 706 may also include data input ports via which any type of data, information, media content, communications, messages, and/or inputs can be received, such as user inputs to the device, as well as any type of audio, video, image, graphics, and/or electronic data received from any content and/or data source.

The example device 700 includes a processor system 708 of one or more processors (e.g., any of microprocessors, controllers, and the like) and/or a processor and memory system implemented as a system-on-chip (SoC) that processes computer-executable instructions. The processor system 708 may be implemented at least partially in computer hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that may be implemented in connection with processing and control circuits, which are generally identified at 710. The example device 700 may also include any type of a system bus or other data and command transfer system that couples the various components within the device. A system bus can include any one or combination of different bus structures and architectures, as well as control and data lines.

The example device 700 also includes memory and/or memory devices 712 (e.g., computer-readable storage memory) that enable data storage, such as data storage devices implemented in hardware which can be accessed by a computing device, and that provide persistent storage of data and executable instructions (e.g., software applications, programs, functions, and the like). Examples of the memory devices 712 include volatile memory and non-volatile memory, fixed and removable media devices, and any suitable memory device or electronic data storage that maintains data for computing device access. The memory devices 712 can include various implementations of random-access memory (RAM), read-only memory (ROM), flash memory, and other types of storage media in various memory device configurations. The example device 700 may also include a mass storage media device.

The memory devices 712 (e.g., as computer-readable storage memory) provide data storage mechanisms, such as to store the device data 704, other types of information and/or electronic data, and various device applications 714 (e.g., software applications and/or modules). For example, an operating system 716 can be maintained as software instructions with a memory device 712 and executed by the processor system 708 as a software application. The device applications 714 may also include a device manager, such as any form of a control application, software application, signal-processing and control module, code that is specific to a particular device, a hardware abstraction layer for a particular device, and so on.

In this example, the device 700 includes an eSIM transfer system 718 that implements various aspects of the described features and techniques for automatic eSIM transfer between devices. The eSIM transfer system 718 can be implemented with hardware components and/or in software as one of the device applications 714, such as when the example device 700 is implemented as the primary device 102 or the secondary device 104. An example of the eSIM transfer system 718 includes the eSIM transfer system 136 that is implemented by the computing device 102 and/or the secondary device 104, such as a software application and/or as hardware components in the devices 102, 104. In implementations, the eSIM transfer system 718 may include independent processing, memory, and logic components as a computing and/or electronic device integrated with the example device 700.

The example device 700 can also include a microphone 720 and/or camera devices 722, as well as motion sensors 724, such as may be implemented as components of an inertial measurement unit (IMU). The camera devices 722 and the microphone 720 can be configured for biometric recognition and detection, e.g., facial recognition, iris recognition, voice recognition. Additionally or alternatively, the example device 700 includes one or more fingerprint sensors configured for fingerprint detection and recognition. The motion sensors 724 can be implemented with various sensors, such as a gyroscope, GPS positioning sensors, an accelerometer, and/or other types of motion sensors to sense motion of the device. The motion sensors 724 can generate sensor data vectors having three-dimensional parameters (e.g., rotational vectors in x, y, and z-axis coordinates) indicating location, position, acceleration, rotational speed, and/or orientation of the device.

The example device 700 can also include one or more power sources 726, such as when the device 700 is implemented as a wireless device and/or mobile device. The power sources may include a charging and/or power system, and can be implemented as a flexible strip battery, a rechargeable battery, a charged super-capacitor, and/or any other type of active or passive power source.

The example device 700 can also include an audio and/or video processing system 728 that generates audio data for an audio system 730 and/or generates display data for a display system 732. The audio system and/or the display system may include any types of devices or modules that generate, process, display, and/or otherwise render audio, video, display, and/or image data. Display data and audio signals can be communicated to an audio component and/or to a display component via any type of audio and/or video connection or data link. In implementations, the audio system 730 and/or the display system 732 are integrated components of the example device 700. Alternatively, the audio system and/or the display system are external, peripheral components to the example device 700.

As used herein, including in the claims, "or" as used in a list of items (e.g., a list of items prefaced by a phrase such as “at least one of” or “one or more of” or “based at least in part on”) indicates an inclusive list such that, a list of at least one of A, B, or C means A or B or C or AB or AC or BC or ABC (i.e., A and B and C). Further, as used herein, the phrase “based on” shall not be construed as a reference to a closed set of conditions. For example, an operation or determination described as “based on condition A” may be based on both a condition A and a condition B without departing from the scope of the present disclosure, and the phrase “based on” shall be construed in the same manner as the phrase “based at least in part on.”

Although implementations for automatic eSIM transfer between devices have been described in language specific to features and/or methods, the appended claims are not necessarily limited to the specific features or methods described. Rather, the specific features and methods are disclosed as example implementations for automatic eSIM transfer between devices, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

In some aspects, the techniques described herein relate to a first device, comprising a first embedded subscriber identity module (eSIM) chip, at least one processor, and a memory coupled to the at least one processor, the memory storing instructions which, when executed by the at least one processor, cause the at least one processor to perform operations including determining, while an eSIM profile associated with a user is activated on the first eSIM chip, that the user is transitioning from using the first device to using a second device, and initiating, in response to the determining, a transfer of the eSIM profile from the first device to the second device, the transfer causing deactivation of the eSIM profile on the first eSIM chip and activation of the eSIM profile on a second eSIM chip of the second device.

In some aspects, the techniques described herein relate to a first device, wherein the determining includes determining that the user is transitioning from using the first device to using the second device based on the user being proximate to the second device while the first device is at least a threshold distance from the second device.

In some aspects, the techniques described herein relate to a first device, wherein the first device and the second device are communicatively coupled to a trusted local network, and the determining includes determining that the user is transitioning from using the first device to using the second device based on the user being proximate to the second device, and the second device having disconnected from the trusted local network.

In some aspects, the techniques described herein relate to a first device, wherein the determining includes determining that the user is transitioning from using the first device to using the second device based on at least one of a current day, a current time of day, and a current physical location of the second device matching previous device usage patterns associated with the second device.

In some aspects, the techniques described herein relate to a first device, wherein the determining includes determining that the user is transitioning from using the first device to using the second device based on a current day and a current time of day matching calendar data indicative of a user activity, the user activity having previously been associated with the second device based on previous usage patterns associated with the second device matching previous calendar data indicative of the user activity.

In some aspects, the techniques described herein relate to a first device, wherein the determining includes determining that the user is transitioning from using the first device to using the second device based on at least one of a current day and a current time of day matching a day and a time of day registered, via user input, with the second device.

In some aspects, the techniques described herein relate to a first device, wherein the determining includes determining that the user is transitioning from using the first device to using the second device based on a current physical location of the second device matching a physical location registered, via user input, with the second device.

In some aspects, the techniques described herein relate to a first device, the operations further comprising displaying, via a display screen of the first device and in response to the determining, a user interface element selectable to initiate the transfer, wherein the transfer is initiated responsive to receiving a user selection of the user interface element.

In some aspects, the techniques described herein relate to a first device, wherein initiating the transfer includes initiating an authentication of the user at the second device, the activation of the eSIM profile on the second eSIM chip occurring in response to a successful authentication of the user at the second device.

In some aspects, the techniques described herein relate to a first device, wherein the first device and the second device are communicatively coupled, and initiating the authentication of the user includes selecting an authentication method for the user that differs based on a type of communicative coupling between the first device and the second device.

In some aspects, the techniques described herein relate to a first device, the operations further including determining, while the eSIM profile is activated on the second eSIM chip, that the user is transitioning from using the second device to using the first device, and initiating, in response to determining that the user is transitioning from using the second device to using the first device, an additional transfer of the eSIM profile from the second device to the first device.

In some aspects, the techniques described herein relate to a method, comprising receiving, by a device and while an embedded subscriber identity module (eSIM) profile associated with a user is activated on a first eSIM chip of an additional device, a transfer notification requesting to transfer the eSIM profile from the additional device to the device based on a determination that the user is transitioning from using the additional device to using the device, the transfer notification indicating that the eSIM profile has been deactivated on the first eSIM chip, and activating, by the device and in response to receiving the transfer notification, the eSIM profile on a second eSIM chip of the device.

In some aspects, the techniques described herein relate to a method, wherein the receiving includes receiving the transfer notification responsive to detecting that the user is proximate to the device while the additional device is at least a threshold distance from the device.

In some aspects, the techniques described herein relate to a method, wherein the device and the additional device are communicatively coupled to a trusted local network, and the receiving includes receiving the transfer notification responsive to disconnecting, by the device, from the trusted local network while the user is detected as proximate to the device.

In some aspects, the techniques described herein relate to a method, wherein the receiving includes receiving the transfer notification based on at least one of a current day, a current time of day, and a current physical location of the device matching previous device usage patterns associated with the device.

In some aspects, the techniques described herein relate to a method, wherein the receiving includes receiving the transfer notification based on a current day and a current time of day matching calendar data indicative of a user activity, the user activity having previously been associated with the device based on previous device usage patterns associated with the device matching previous calendar data indicative of the user activity.

In some aspects, the techniques described herein relate to a method, wherein the receiving includes receiving the transfer notification based on at least one of a current day and a current time of day matching a day and a time of day registered, via user input, with the device, and a current physical location of the device matching a physical location registered, via user input, with the device.

In some aspects, the techniques described herein relate to a method, wherein the device and the additional device are communicatively coupled, activating the eSIM profile includes authenticating the user at the device, and an authentication method used to authenticate the user differs based on a type of communicative coupling between the device and the additional device.

In some aspects, the techniques described herein relate to a method, further comprising receiving, by the device and while the eSIM profile is activated on the second eSIM chip, an additional transfer notification requesting to transfer the eSIM profile from the device to the additional device based on an additional determination that the user is transitioning from using the device to using the additional device, and deactivating, in response to receiving the additional transfer notification, the eSIM profile on the second eSIM chip of the device, thereby enabling activation of the eSIM profile on the first eSIM chip of the additional device.

In some aspects, the techniques described herein relate to a method, comprising determining, by a first device and while an embedded subscriber identity module (eSIM) profile associated with a user is activated on a second device, that the user is transitioning from using the second device to using the first device, and automatically initiating, by the first device and in response to the determining, a transfer of the eSIM profile from the second device to the first device, the transfer causing deactivation of the eSIM profile on the second device and activation of the eSIM profile on the first device.

The invention claimed is:

1. A first device, comprising:
- a first embedded subscriber identity module (eSIM) chip;
- at least one processor; and
- a memory coupled to the at least one processor, the memory storing instructions which, when executed by the at least one processor, cause the at least one processor to perform operations including:
  - automatically detecting, while an eSIM profile associated with a user is activated on the first eSIM chip, a transfer event indicating that the user is transitioning from using the first device to using a second device, the transfer event detected without user input at the first device and the second device based on contextual data associated with the first device and the second device; and
  - initiating, in response to detecting the transfer event, a transfer of the eSIM profile from the first device to the second device, the transfer causing deactivation of the eSIM profile on the first eSIM chip and activation of the eSIM profile on a second eSIM chip of the second device.

2. The first device of claim 1, wherein the transfer event is detected based on the user being proximate to the second device while the first device is at least a threshold distance from the second device.

3. The first device of claim 1, wherein the first device and the second device are communicatively coupled to a trusted local network, and the transfer event is detected based on the user being proximate to the second device, and the second device having disconnected from the trusted local network.

4. The first device of claim 1, wherein the transfer event is detected based on at least one of a current day, a current time of day, and a current physical location of the second device matching previous device usage patterns associated with the second device.

5. The first device of claim 1, wherein the transfer event is detected based on a current day and a current time of day matching calendar data indicative of a user activity, the user activity having previously been associated with the second device based on previous usage patterns associated with the second device matching previous calendar data indicative of the user activity.

6. The first device of claim 1, wherein the transfer event is detected based on at least one of a current day and a current time of day matching a day and a time of day registered, via user input, with the second device.

7. The first device of claim 1, wherein the transfer event is detected based on a current physical location of the second device matching a physical location registered, via user input, with the second device.

8. The first device of claim 1, the operations further comprising displaying, via a display screen of the first device and in response to detecting the transfer event, a user interface element selectable to initiate the transfer, wherein the transfer is initiated responsive to receiving a user selection of the user interface element.

9. The first device of claim 1, the operations further comprising completing the transfer by initiating an authentication of the user at the second device, the activation of the eSIM profile on the second eSIM chip occurring in response to a successful authentication of the user at the second device.

10. The first device of claim 9, wherein the first device and the second device are communicatively coupled, and initiating the authentication of the user includes selecting an authentication method for the user that differs based on a type of communicative coupling between the first device and the second device.

11. The first device of claim 1, the operations further including:
- detecting, while the eSIM profile is activated on the second eSIM chip, an additional transfer event indicating that the user is transitioning from using the second device to using the first device; and
- initiating, in response to detecting the additional transfer event, an additional transfer of the eSIM profile from the second device to the first device.

12. A method, comprising:
- receiving, by a device and while an embedded subscriber identity module (eSIM) profile associated with a user is activated on a first eSIM chip of an additional device, a transfer notification requesting to transfer the eSIM profile from the additional device to the device based on an automatic detection of a transfer event indicating that the user is transitioning from using the additional device to using the device, the transfer event detected without user input at the device and the additional device based on contextual data associated with device and the additional device, the transfer notification indicating that the eSIM profile has been deactivated on the first eSIM chip; and activating, by the device and in response to receiving the transfer notification, the eSIM profile on a second eSIM chip of the device.

13. The method of claim 12, wherein the transfer notification is received responsive to detecting that the user is proximate to the device while the additional device is at least a threshold distance from the device.

14. The method of claim 12, wherein the device and the additional device are communicatively coupled to a trusted local network, and the transfer notification is received responsive to disconnecting, by the device, from the trusted local network while the user is detected as proximate to the device.

15. The method of claim 12, wherein the transfer notification is received based on at least one of a current day, a current time of day, and a current physical location of the device matching previous device usage patterns associated with the device.

16. The method of claim 12, wherein the transfer notification is received based on a current day and a current time of day matching calendar data indicative of a user activity, the user activity having previously been associated with the device based on previous device usage patterns associated with the device matching previous calendar data indicative of the user activity.

17. The method of claim 12, wherein the transfer notification is received based on at least one of:

a current day and a current time of day matching a day and a time of day registered, via user input, with the device, and a current physical location of the device matching a physical location registered, via user input, with the device.

18. The method of claim 12, wherein the device and the additional device are communicatively coupled, activating the eSIM profile includes authenticating the user at the device, and an authentication method used to authenticate the user differs based on a type of communicative coupling between the device and the additional device.

19. The method of claim 12, further comprising:

receiving, by the device and while the eSIM profile is activated on the second eSIM chip, an additional transfer notification requesting to transfer the eSIM profile from the device to the additional device based on an additional detection that the user is transitioning from using the device to using the additional device; and deactivating, in response to receiving the additional transfer notification, the eSIM profile on the second eSIM chip of the device, thereby enabling activation of the eSIM profile on the first eSIM chip of the additional device.

20. A method, comprising:

automatically detecting, by a first device and while an embedded subscriber identity module (eSIM) profile associated with a user is activated on a second device, a transfer event indicating that the user is transitioning from using the second device to using the first device, the transfer event detected without user input at the first device and the second device based on contextual data associated with the first device and the second device; and automatically initiating, by the first device and in response to detecting the transfer event, a transfer of the eSIM profile from the second device to the first device, the transfer causing deactivation of the eSIM profile on the second device and activation of the eSIM profile on the first device.

* * * * *